(12) United States Patent
Boys

(10) Patent No.: US 7,781,916 B2
(45) Date of Patent: Aug. 24, 2010

(54) PARALLEL-TUNED PICK-UP SYSTEM WITH MULTIPLE VOLTAGE OUTPUTS

(75) Inventor: John T. Boys, Auckland (NZ)

(73) Assignee: Auckland Uniservices Limited, Auckland (NZ)

( * ) Notice: Subject to any disclaimer, the term of this patent is extended or adjusted under 35 U.S.C. 154(b) by 847 days.

(21) Appl. No.: 10/558,493

(22) PCT Filed: May 26, 2004

(86) PCT No.: PCT/NZ2004/000102

§ 371 (c)(1), (2), (4) Date: Jan. 24, 2007

(87) PCT Pub. No.: WO2004/105207

PCT Pub. Date: Dec. 2, 2004

(65) Prior Publication Data

US 2007/0120421 A1    May 31, 2007

(30) Foreign Application Priority Data

May 26, 2003 (NZ) .................................. 526109

(51) Int. Cl.
*H01F 27/42* (2006.01)
(52) U.S. Cl. ......................... 307/104; 307/17
(58) Field of Classification Search ............. 307/17, 307/104, 109; 315/209 R; 363/23; 323/358
See application file for complete search history.

(56) References Cited

U.S. PATENT DOCUMENTS

| | | | |
|---|---|---|---|
| 4,370,607 A * | 1/1983 | Dassonville | 323/271 |
| 5,293,308 A * | 3/1994 | Boys et al. | 363/37 |
| 5,450,305 A * | 9/1995 | Boys et al. | 363/24 |
| 5,528,113 A * | 6/1996 | Boys et al. | 318/16 |
| 5,619,078 A * | 4/1997 | Boys et al. | 307/85 |
| 5,767,592 A * | 6/1998 | Boys et al. | 307/108 |
| 5,821,638 A * | 10/1998 | Boys et al. | 307/104 |

(Continued)

FOREIGN PATENT DOCUMENTS

EP        818868 A2 *    1/1998

(Continued)

OTHER PUBLICATIONS

Aiguo Patrick Hu, Selected Resonant Converters For IPT Power Supplies, Oct. 2001, The University of Auckland, pp. 1-23.*

(Continued)

*Primary Examiner*—Albert W Paladini
*Assistant Examiner*—Daniel Cavallari
(74) *Attorney, Agent, or Firm*—Cooper & Dunham LLP

(57) ABSTRACT

A pick-up is provided for an Inductively Coupled Power Transfer (ICPT) system having a parallel tuned resonant pick-up circuit. The pick-up has a plurality of independently controllable power supply outputs. This allows a first output to supply a high voltage load (e.g. 300V-550V) and one or more additional outputs for supplying other loads such as control circuitry which may only require 24V. The one or more additional outputs may be supplied via a current transformer connected in series with the resonant pick-up circuit. Control for each output may be achieved by partially or completely decoupling the pick-up from a primary conductive path of the ICPT system.

25 Claims, 2 Drawing Sheets

U.S. PATENT DOCUMENTS

| | | | |
|---|---|---|---|
| 5,831,841 A | 11/1998 | Nishino et al. | |
| 5,898,579 A * | 4/1999 | Boys et al. | 363/23 |
| 6,100,663 A * | 8/2000 | Boys et al. | 320/108 |
| 6,188,179 B1 * | 2/2001 | Boys et al. | 315/244 |
| 6,317,338 B1 * | 11/2001 | Boys | 363/25 |
| 6,462,432 B1 | 10/2002 | Seelig et al. | |
| 6,483,202 B1 * | 11/2002 | Boys | 307/17 |
| 6,621,183 B1 * | 9/2003 | Boys | 307/145 |
| 6,705,441 B1 * | 3/2004 | Boys et al. | 191/10 |
| 6,900,557 B1 * | 5/2005 | Gaudreau et al. | 307/113 |
| 7,279,850 B2 * | 10/2007 | Boys et al. | 315/244 |
| 7,474,062 B2 * | 1/2009 | Boys et al. | 315/209 R |
| 2001/0012208 A1 * | 8/2001 | Boys | 363/23 |
| 2003/0094855 A1 * | 5/2003 | Lohr et al. | 307/109 |
| 2004/0119340 A1 * | 6/2004 | Nishino | 307/31 |
| 2006/0082323 A1 * | 4/2006 | Boys et al. | 315/209 R |
| 2006/0082324 A1 * | 4/2006 | Boys et al. | 315/209 R |

FOREIGN PATENT DOCUMENTS

| | | | |
|---|---|---|---|
| EP | 1211776 A2 * | 6/2002 | |
| EP | 1673846 A1 * | 6/2006 | |
| JP | 0587923 | 3/1994 | |
| JP | 06269124 A * | 9/1994 | |
| JP | 07-087691 | 3/1995 | |
| JP | 08-308152 | 11/1996 | |
| WO | WO-81/03731 | 12/1981 | |
| WO | WO 9323908 A1 * | 11/1993 | |
| WO | WO 9323909 A1 * | 11/1993 | |
| WO | WO 9511550 A1 * | 4/1995 | |
| WO | WO 9602970 A1 * | 2/1996 | |
| WO | WO 9636203 A1 * | 11/1996 | |
| WO | WO 9716054 A1 * | 5/1997 | |
| WO | WO 9742695 A1 * | 11/1997 | |
| WO | WO 9850993 A1 * | 11/1998 | |
| WO | WO-99/26329 | 5/1999 | |
| WO | WO 9926329 A1 * | 5/1999 | |
| WO | WO 9930402 A1 * | 6/1999 | |
| WO | WO 2004042750 A1 * | 5/2004 | |
| WO | WO 2004105207 A1 * | 12/2004 | |
| WO | WO 2006118475 A1 * | 11/2006 | |
| WO | WO 2007100265 A1 * | 9/2007 | |
| WO | WO 2007126321 A1 * | 11/2007 | |
| WO | WO 2007139401 A2 * | 12/2007 | |

OTHER PUBLICATIONS

International Search Report, PCT/NZ2004/000102, Aug. 20, 2004.*
Huang et al., A Low Cost Combined Contactless Power and Communication System, 2004, The School of Engineering, Department of Electrical & Computer Engineering Part IV Project Report, pp. 1-56.*

* cited by examiner

PARALLEL-TUNED PICK-UP SYSTEM WITH MULTIPLE VOLTAGE OUTPUTS

CROSS REFERENCE TO PRIOR APPLICATION

This is a U.S. National Phase application under 35 U.S.C. §371 of International Patent Application No. PCT/NZ2004/000102, filed May 26, 2004, which claims priority to New Zealand Patent Application No. 526109, filed on May 26, 2003. The International Application was published on Dec. 2, 2004 as WO 2004/105207 A1 under PCT Article 21(2).

FIELD OF THE INVENTION

This invention relates to Inductively Coupled Power Transfer (ICPT) systems, particularly parallel tuned pick-ups for ICPT systems.

BACKGROUND TO INVENTION

ICPT systems generally consist of two electrically isolated parts. The first is a trackway or primary conductive pathway which is usually supplied with a very low frequency (VLF; typically 5-50 kHz) current. The primary conductive pathway is usually elongate but can take a variety of different forms.

The second part, which is usually referred to as a pick-up, supplies an electrical load with power derived from the primary conductive path. The pick-up has a pick-up coil (i.e. at least a partial turn of conductive material) in which a voltage is induced by mutual magnetic induction between the pick-up coil and the primary conductive path. The pick-up coil which is tuned with a capacitor to augment the power transfer capability. The tuning may be achieved with a series capacitor or a parallel capacitor. The output from the tuned circuit is then rectified and fed to a controller such as that described in the specification of U.S. Pat. No. 5,293,308, which partially decouples the pick-up coil to control the power transfer and match the power taken from the pathway to that required by the load. In this way a single output voltage is produced and maintained.

However, in many circumstances more than one output voltage is required—for example the ICPT system may be required to produce a 300 V (or higher) output voltage for a motor drive and at the same time provide 24 V DC for independently driving other control circuitry. With a series-tuned pick-up system an extra output voltage is relatively easy to produce. A conventional series pick-up and controller system is shown in FIG. 1. Current I induces a mutually coupled voltage in pick-up inductance 100 which is tuned with capacitor 101. The resonating current produced is rectified by bridge rectifier 102 to charge a large capacitor 103. Switch S 104 in combination with diode 105 and inductor 106 act as a Buck converter to produce a controlled output voltage on the load capacitor 107 and the load resistor 108. In this circuit the input voltage to the bridge rectifier 102 is essentially constant and independent of the load current. Thus, a simple transformer T 209 may be connected as shown across the rectifier bridge 202 as shown in FIG. 2. This transformer allows this voltage to be isolated and scaled as required (by changing the transformer turns-ratio). A simple rectifier filter and regulator circuit Reg 210 using any of a number of well known techniques then allows an additional output voltage (eg 24 V DC) to be produced. Series tuned systems, however, have higher internal working voltages than parallel tuned systems. For an output voltage of 300 V DC with a tuned circuit Q of 10 the voltage across the tuning capacitor would be 3 kV. Thus, for high power applications series tuned circuits are not preferred.

For the simple parallel tuned circuit of FIG. 3 the voltages across the tuned components L 300 and C 301 are similar to the output voltage across resistor 307 so that very high voltages do not occur. The detailed operation of this circuit is well known from U.S. Pat. No. 5,293,308, the contents of which are incorporated herein by reference. The circuit allows the power transfer from the primary conductive path of the ICPT system to be matched to the power required by the load. The output power from the circuit is controlled by the duty cycle of the switch 304 operating at some switching frequency. If the switch 304 is closed for most of the switching cycle corresponding to a high duty cycle the average output power is reduced, and if the switch 304 is open for most of the duty cycle the average output power will increase. Thus, the output power may be controlled by adjusting the switch duty cycle. If the switch 304 is held permanently closed the pick-up circuit becomes essentially completely decoupled from the trackway and essentially no power is transferred to the pick-up coil from the trackway. In operation therefore the duty cycle of the switch is controlled so that the pick-up coil is partially decoupled and the power transferred from the trackway to the pick-up coil is matched to the power required by the load. As described in U.S. Pat. No. 5,293,308, this may be performed by detecting the voltage across the load, comparing the detected voltage with a nominal or required output voltage, and coupling or decoupling as necessary to alter the output voltage toward the nominal output voltage. However, the input voltage to the rectifier bridge B 302 falls to nearly zero on very light loads corresponding to very low power transfer, so that a voltage transformer connected across the rectifier bridge as shown in FIG. 2 cannot be used to produce an additional independent output voltage.

Another possible option for generating an independent output from the pick-up topology shown in FIG. 3 is to feed the first output to a switching converter or regulator to provide an additional output at the required output voltage. However, as mentioned above, the first output (i.e. that which supplies load 307 in FIG. 3) is typically required to be in the vicinity of 300V to 550V which means that a switching device capable of handling these voltage levels is required. Such devices are expensive, and are not generally available for voltages at the top end of this range. Another disadvantage with using the first output is that the high voltage needs to be maintained even when the load it supplies is in an "off" state.

OBJECT OF THE INVENTION

It is an object of the present invention to provide an ICPT system with a parallel tuned pick-up that is capable of producing two or more independently controlled output voltages which reduces or overcomes one or more of the abovementioned limitations, or which will at least provide the public with a useful alternative.

Other objects of the invention may become apparent from the following description, given by way of example and with reference to the accompanying diagrams.

BRIEF SUMMARY OF THE INVENTION

According to one aspect of the invention there is provided an ICPT system pick-up comprising:

a pick-up coil capable of generating a voltage by magnetic induction from a primary conductive pathway, the pick-up coil being part of a pick-up resonant circuit having a pick-up resonant frequency and a tuning capacitor connected in parallel with the pick-up coil;

a first output associated with a first control means to substantially control the voltage provided by the first output;

a current transformer connected in series with the pick-up resonant circuit;

one or more additional outputs associated with the current transformer and one or more additional control means associated with the or each additional output to substantially control the voltage(s) provided by the or each additional output, whereby the voltages of the first output and the one or more additional outputs are independently controllable.

The first control means may include a first decoupling means and the one or more additional control means may include an additional decoupling means, each decoupling means allowing the pick-up coil to be at least partly decoupled from the primary conductive pathway to thereby control the power flow from the primary conductive pathway to the pick-up coil.

In a preferred embodiment the first decoupling means and the or each additional decoupling means include a switch, activation or deactivation of the switch causing the pick-up coil to be decoupled or coupled from or to the primary conductive path.

According to a further aspect of the invention there is provided an ICPT system pick-up comprising:

a pick-up coil capable of generating a voltage by magnetic induction from a primary conductive pathway, the pick-up coil being part of a pick-up resonant circuit having a pick-up resonant frequency and a tuning capacitor connected in parallel with the pick-up coil;

a first output associated with a first control means to control power transfer from the primary conductive pathway to the pick-up coil to correspond to the power required by a first output load connectable to the first output;

a current transformer connected in series with the pick-up resonant circuit;

one or more additional outputs associated with the current transformer, and one or more additional control means associated with the or each additional output to control power transfer from the primary conductive pathway to the pick-up coil to correspond to the power required by one or more additional output loads connectable to the or each additional output.

In preferred embodiments the first control means includes a first decoupling means and the or each additional control means includes an additional decoupling means. Each decoupling means allows the pick-up coil to be at least partly decoupled from the primary conductive pathway to thereby control the power flow from the primary conductive pathway to the pick-up coil.

The first control means may activate or deactivate the first decoupling means to regulate the voltage across the first output to a first required output voltage, and the or each additional control means may activate or deactivate the additional decoupling means to regulate the voltage across the or each additional output to one or more additional required output voltage(s).

The first decoupling means and the or each additional decoupling means may include a switch, activation or deactivation of the switch causing the pick-up coil to be decoupled or coupled from or to the primary conductive path.

The current transformer has a first winding and a second winding, the first winding being connected in series with the pick-up resonant circuit and the second winding being connected to at least one of the additional control means.

The switch is preferably a controlled switch adapted to be activated and deactivated in a duty cycle at a predetermined frequency.

Alternatively the first decoupling means or the one or more additional decoupling means may comprise a zener diode.

A snubber capacitance may be provided across the first winding of the current transformer.

In a further aspect the invention provides an adaptor circuit for an ICPT system, the adaptor circuit comprising one or more current transformers connectable in series with a parallel-tuned pick-up of the ICPT system, an output associated with a control means to match the power transfer from a primary conductive pathway of the ICPT system with that required by an output load connectable to the output.

The control means preferably comprises a control circuit of the adaptor, the control circuit including decoupling means to match the power transfer from the primary conductive pathway with that required by the load by controllably at least partly decoupling the pick-up coil from the primary conductive pathway.

The control circuit preferably activates or deactivates the decoupling means to regulate the voltage across the output to a required output voltage.

The current transformer has a first winding and a second winding, the first winding being connected in series with the pick-up resonant circuit and the second winding being connected to the control circuit.

In a preferred embodiment the decoupling means includes a switch, activation or deactivation of the switch causing the pick-up coil to be decoupled or coupled from or to the primary conductive path.

The switch may be a controlled switch adapted to be activated and deactivated in a duty cycle at a predetermined frequency.

Alternatively the decoupling means may comprise a zener diode.

A snubber capacitance may be provided across the first winding of the current transformer.

In a further aspect the invention provides a method of providing an independently controllable output from a parallel tuned pick-up of an ICPT system, the method comprising:

interconnecting a current transformer in series with the parallel tuned pick-up, and providing a control means adapted to match the power transfer from a primary conductive pathway of the ICPT system with that required by an output load connectable to the independently controllable output.

Control of the power transfer from the primary conductive pathway to match that required by the output load may be effected by controllably at least partly decoupling the pick-up coil from the primary conductive pathway.

The method may further include detecting the voltage of the independently controllable output, comparing the detected voltage with a required voltage and controlling the decoupling control means to couple or decouple the pick-up coil to or from the primary conductive path to alter the voltage of the independently controllable output toward the required voltage.

As a further step a further current transformer may be connected in series with the parallel tuned pick-up to supply a further independently controllable output.

A snubber capacitance may be provided across the primary winding of the current transformer.

In another aspect the invention provides an ICPT pick-up including a pick-up resonant circuit comprising a pick-up coil and a tuning capacitor connected in parallel with the pick-up coil, the resonant circuit supplying two or more outputs, and control means to independently control the voltage of each of the outputs.

In yet another aspect the invention provides an ICPT pick-up including a pick-up resonant circuit comprising a pick-up coil and a tuning capacitor connected in parallel with the pick-up coil, the resonant circuit supplying two or more outputs, and control means to independently control the power transferred from a primary conductive pathway of the ICPT system to the pick-up coil for each output.

Other aspects of the invention may become apparent from the following description, given by way of example and with reference to the drawings.

The word "comprise" or "comprises" or "comprising" is used in this specification in a manner which is intended to be inclusive rather than restricting.

BRIEF DESCRIPTION OF DRAWINGS

A preferred embodiment of the invention will be described by way of example with reference to the accompanying drawings, in which.

DETAILED DESCRIPTION OF THE INVENTION

Figure 1:
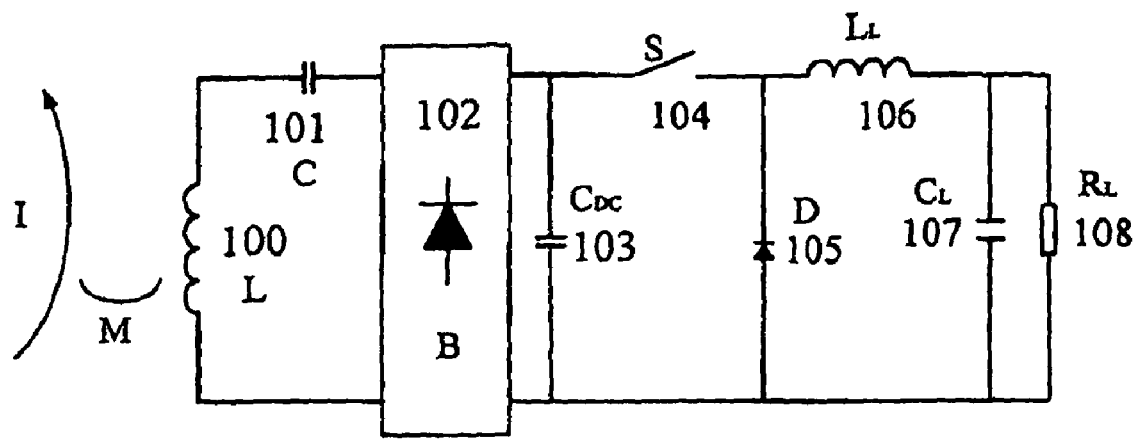
FIG. 1: Shows a conventional series-tuned pick-up system with decoupling controller.
Figure 2:
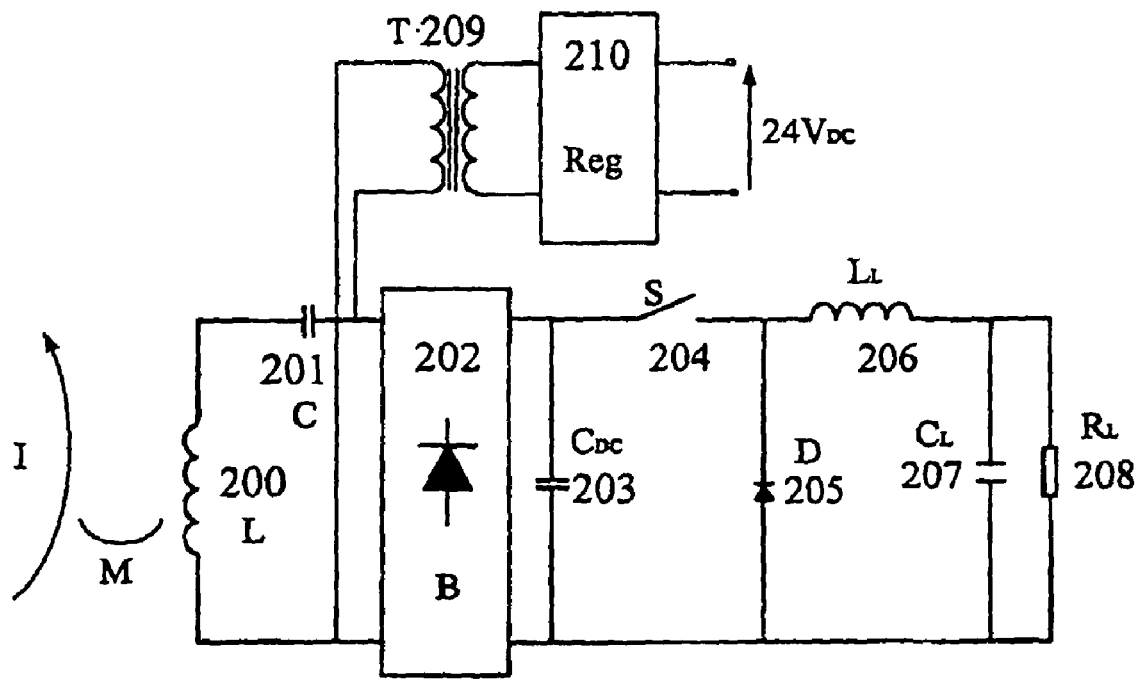
FIG. 2: Series-tuned pick-up with two independently controlled outputs.
Figure 3:
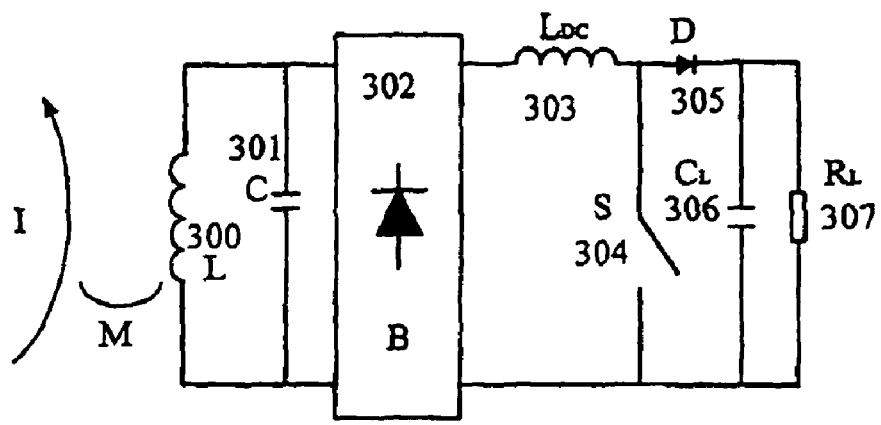
FIG. 3: Parallel tuned pick-up system and decoupling controller.
Figure 4:
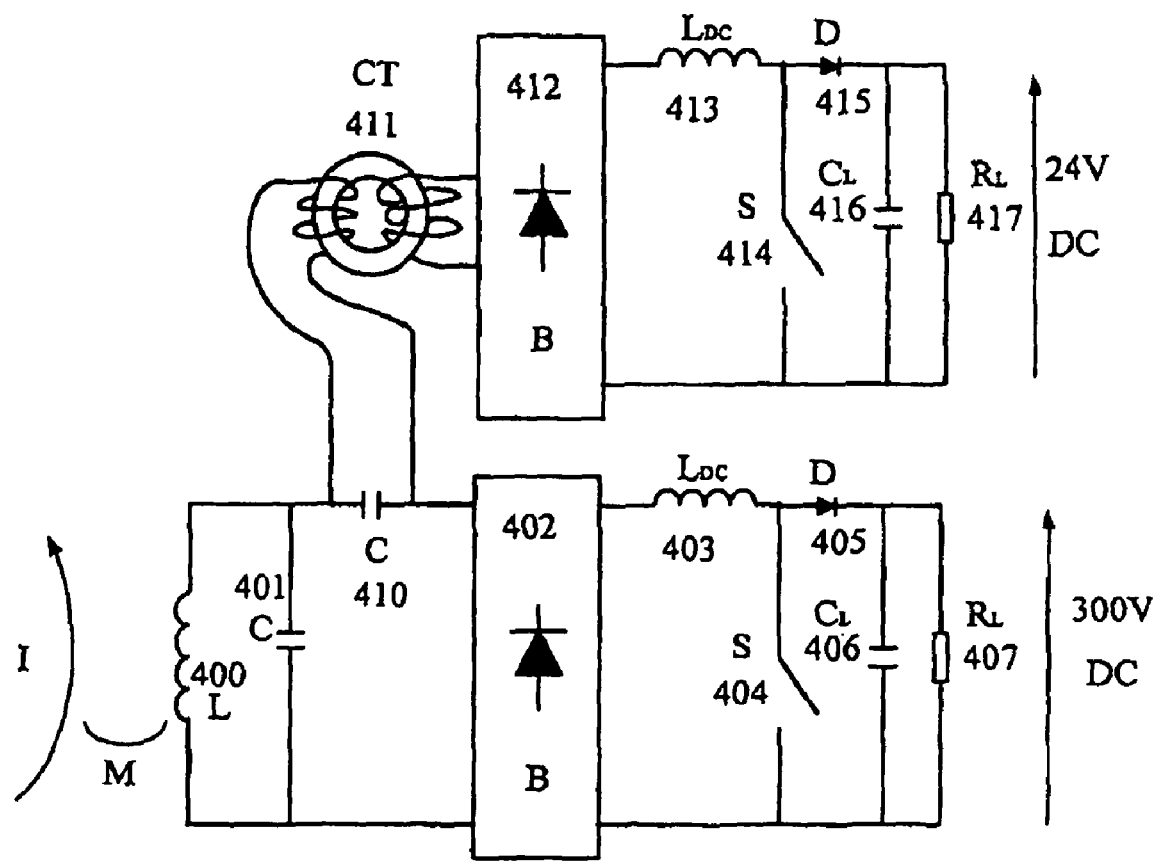
FIG. 4: Parallel tuned pick-up system with two independently controllable outputs.

FIG. 4 shows a circuit of the invention with two independently controllable outputs. With the parallel tuned circuit of FIG. 3 L 300 and C 301 (also shown in FIG. 4 as L 400 and C 401) the AC input current to the rectifier bridge B 302 (B 402) is essentially constant, with a magnitude given by $$I \frac{M}{L},$$

and is independent of either the load resistor 307 (first load 407) or the state of the switch S 304 (the switch S 404 of the first control circuit). Thus, adding current transformer CT 411, shown in FIG. 4, in series with the pick-up resonant circuit allows a transformed constant (AC) current to be input to rectifier bridge B 412 of the additional control circuit.

The circuitry of the additional control circuit after rectifier bridge B 412 (413 to 417) is identical in concept to that of FIG. 3 (303 to 307; and to the circuitry of components 403 to 407 of the first control circuit in FIG. 4) allowing a completely independent output voltage—eg 24 V DC—to be produced. Switches S 404 and S 414 may be operated at a high switching rate or may be switched slowly, in any combination the circuit designer requires. For example, the duty cycle control strategy mentioned above may be used. Switch S 414 is essentially connected in parallel with the secondary winding of the current transformer CT 411, allowing the additional output to be at least partially decoupled from the pick-up coil.

Small snubber capacitor 410 which is connected across the primary of the current transformer CT 411 allows for harmonic differences in the rectifier input currents of B 402 and B 412 and compensates for leakage inductance in current transformer 411.

The first control circuit and the second control circuit each independently control the power transfer to the pick-up coil to match the requirements of the load they supply. The control of the decoupling switches 404 and 414 may be implemented by detecting the voltage at the relevant output across the relevant load, comparing this with a nominal or required output voltage (e.g. 300V for the first output and 24V for the additional output) and controlling each switch as required to alter the output voltage toward the nominal output.

The control switches may be replaced by zener diodes (not shown). With this option, a constant amount of power is transferred from the primary conductive path to the relevant control circuit. The amount of power transferred is greater than the maximum required by the actual load connected to the output. Although this can be inefficient, it is a practical option for controlling additional supply outputs that are required to supply low voltages, since only a few watts will be lost.

The turns-ratio in current transformer CT 411 determines the maximum possible output current for the shown 24 V DC output. If the turns ratio is 1:1 then both DC outputs across loads 407 and 417 will have the same nominal short-circuit current capacity. For a turns ratio of 2:1 there will be a current step-up and the 24 V DC output will be able to produce twice the DC current of the high voltage output.

For example, a practical 1.5 kW pick-up system may produce 500 V DC at 3 A. With a 1:1 CT and using the circuit of FIG. 4 it can also produce 24 V DC at 3 A. These outputs are completely independent and galvanically isolated from each other. In operation, for example, either one can be short-circuited or open-circuited with no effect on the performance of the other. This system would be difficult to duplicate with a series tuned pick-up as the working voltages would become extremely high for a DC output voltage of 500 V.

For multiple output voltages extra current transformers with the appropriate control circuitry can be added in a series string in the wire connecting the parallel tuned circuit to the rectifier bridge B 402, across capacitor 410. The outputs of all of these circuits would again be completely independent and isolated from each other.

It will be appreciated that the invention may be in the form of a new ICPT system, or may be an add-on circuit to an existing ICPT system to provide for two or more, independently controllable, outputs.

Thus, the ICPT system of the invention provides a number of advantages over the prior art, including:

it provides for multiple voltage outputs for high power applications without the problem of very high internal working voltages;

it provides for multiple, independently controllable outputs. The power flow from the primary conductive pathway to the pick-up coil is controlled individually by each controller to match the power taken by the load associated with that controller;

it can be an add-on to existing ICPT systems;

it provides a considerably less expensive means of providing a lower voltage output than a conventional DC-DC converter stepdown process would.

The scope of the invention is not limited to the specific embodiments described above, and represented in FIG. 4, which are preferred embodiments. The invention also includes those modifications, additions, improvements, equivalents and substitutions which a person skilled in the art would appreciate are within the scope of the invention.

The invention claimed is:

1. An inductively coupled power transfer (ICPT) system pick-up comprising:
   a pick-up coil capable of generating a voltage by magnetic induction from a primary conductive pathway, the pick-up coil being part of a pick-up resonant circuit having a pick-up resonant frequency and a tuning capacitor connected in parallel with the pick-up coil;
   a first output associated with a first controller to substantially control a voltage provided by the first output;
   a current transformer connected in series with the pick-up resonant circuit; one or more additional outputs associated with the current transformer; and
   one or more additional controllers associated with each of the one or more additional outputs to substantially control a voltage provided by the one or more additional outputs,
   whereby the voltages of the first output and the one or more additional outputs are independently controllable.

2. A pick-up as claimed in claim 1, wherein the first controller comprises a first decoupling device and the one or more additional controllers comprises an additional decoupling device, each decoupling device operable to allow the pick-up coil to be at least partly decoupled from the primary conductive pathway to thereby control the power flow from the primary conductive pathway to the pick-up coil.

3. A pick-up as claimed in claim 2, wherein each decoupling device comprises a switch, and activation or deactivation of the switch causes the pick-up coil to be decoupled or coupled from or to the primary conductive path.

4. A pick-up as claimed in claim 3, wherein the switch is a controlled switch adapted to be activated and deactivated in a duty cycle at a predetermined frequency.

5. A pick-up as claimed in claim 3, wherein the first controller and the one or more additional controllers each comprise:
   a rectifier having first and second output terminals; and
   a DC inductor having first and second terminals, the first terminal of the DC inductor being connected to the first output terminal of the rectifier, the second terminal of the DC inductor being connected to a first terminal of the switch, and a second terminal of the switch being connected to the second output terminal of the rectifier.

6. A pick-up as claimed in claim 5, wherein a diode is connected between the first terminal of the switch and a first terminal of a filter capacitor, a second terminal of the filter capacitor is connected to the second terminal of the switch, and a load may be connected between the first and second terminals of the filter capacitor.

7. A pick-up as claimed in claim 2, wherein at least one of the first decoupling device or the one or more additional decoupling devices comprises a zener diode.

8. A pick-up as claimed in claim 1, wherein the current transformer has a first winding and a second winding, the first winding being connected in series with the pick-up resonant circuit and the second winding being connected to at least one of the one or more additional controllers.

9. A pick-up as claimed in claim 8 further comprising a snubber capacitance provided across the first winding.

10. An ICPT system comprising the ICPT system pick-up as set forth in claim 1.

11. A method for controlling at least one independently controllable output from a parallel-tuned pick-up of an inductively coupled power transfer (ICPT) system, the method comprising the steps of:
   interconnecting a first current transformer in series with the parallel-tuned pick-up; and
   providing a controller adapted to individually control a power transfer from a primary conductive pathway of the ICPT system to the parallel-tuned pick-up to meet a power required by an output load connectable to a first independently controllable output associated with the first current transformer.

12. A method as claimed in claim 11, further comprising the step of:
   controlling the power transfer from the primary conductive pathway with the power required by the output load by at least partly decoupling a pick-up coil of the parallel-tuned pick-up from the primary conductive pathway.

13. A method as claimed in claim 12, further comprising the steps of:
   detecting a voltage of the independently controllable output;
   comparing the detected voltage with a required voltage; and
   controlling a coupling between the pick-up coil and the primary conductive pathway by coupling or decoupling the pick-up coil to or from the primary conductive path to alter the voltage of the independently controllable output toward the required voltage.

14. An inductively coupled power transfer (ICPT) system pick-up comprising:

15. A method as claimed in claim 12 further comprising the step of: providing a snubber capacitance across a primary winding of the current transformer.

16. A pick-up as claimed in claim 14, wherein the first controller activates or deactivates the first decoupling device to regulate the voltage across the first output to a first required output voltage, and each of the one or more additional controllers activates or deactivates the one or more additional decoupling devices to regulate the voltage across the one or more additional outputs to one or more required output voltages.
   a pick-up coil capable of generating a voltage by magnetic induction from a primary conductive pathway, the pick-up coil being part of a pick-up resonant circuit having a pick-up resonant frequency and a tuning capacitor connected in parallel with the pick-up coil;
   a first output associated with a first controller to control power transfer from the primary conductive pathway to the pick-up coil to correspond to a power required by a first output load connectable to the first output;
   a current transformer connected in series with the pick-up resonant circuit;
   one or more additional outputs associated with the current transformer; and
   one or more additional controllers associated with each of the one or more additional outputs to control power transfer from the primary conductive pathway to the pick-up coil to correspond to a power required by one or more additional output loads connectable to each of the one or more additional outputs.

17. A pick-up as claimed in claim 16, wherein the first controller comprises a first decoupling device and each of the one or more additional controllers comprises an additional decoupling device, each decoupling device operable to allow the pick-up coil to be at least partly decoupled from the primary conductive pathway to thereby control the power flow from the primary conductive pathway to the pick-up coil.

18. A pick-up as claimed in claim 17, wherein the first decoupling device and each of the one or more additional decoupling devices comprises a switch having first and second terminals, and activation or deactivation of the switch causes the pick-up coil to be decoupled or coupled from or to the primary conductive path.

19. A pick-up as claimed in claim 18, wherein the switch is a controlled switch adapted to be activated and deactivated in a duty cycle at a predetermined frequency.

20. A pick-up as claimed in claim 18, wherein the first controller and the one or more additional controllers each comprise:

a rectifier having first and second output terminals; and a DC inductor having first and second terminals, the first terminal of the DC inductor being connected to the first output terminal of the rectifier, the second terminal of the DC inductor being connected to a first terminal of the switch, and a second terminal of the switch being connected to the second output terminal of the rectifier.

21. A pick-up as claimed in claim 20, wherein a diode is connected between the first terminal of the switch and a first terminal of a filter capacitor, a second terminal of the filter capacitor is connected to the second terminal of the switch, and the first output load or the one or more additional output loads may be connected between the first and second terminals of the filter capacitor.

22. A pick-up as claimed in claim 17, wherein at least one of the first decoupling device or the one or more additional decoupling devices comprises a zener diode.

23. A pick-up as claimed in claim 22, further comprising a snubber capacitance provided across the first winding.

24. A method as claimed in claim 12, further comprising the step of: connecting a second current transformer in series with the parallel tuned pick-up to supply a second independently controllable output.

25. A pick-up as claimed in claim 16, wherein the current transformer has a first winding and a second winding, the first winding being connected in series with the pick-up resonant circuit and the second winding being connected to at least one of the one or more additional controllers.

* * * * *